US012798056B2

(12) United States Patent
Lin

(10) Patent No.: US 12,798,056 B2
(45) Date of Patent: Nov. 17, 2026

(54) ENGAGING STRUCTURE FOR HAND TOOL

(71) Applicant: Shu-Kai Lin, Taichung City (TW)

(72) Inventor: Shu-Kai Lin, Taichung City (TW)

( * ) Notice: Subject to any disclaimer, the term of this patent is extended or adjusted under 35 U.S.C. 154(b) by 308 days.

(21) Appl. No.: 18/742,741

(22) Filed: Jun. 13, 2024

(65) Prior Publication Data

US 2025/0381648 A1 Dec. 18, 2025

(51) Int. Cl.
*B25B 13/06* (2006.01)

(52) U.S. Cl.
CPC .................................. *B25B 13/065* (2013.01)

(58) Field of Classification Search
CPC ....... B25B 13/065; B25B 13/06; B25B 13/08; B25B 13/04
USPC ........................................................... 81/186
See application file for complete search history.

(56) References Cited

U.S. PATENT DOCUMENTS

| | | | | |
|---|---|---|---|---|
| 7,661,339 B2 * | 2/2010 | Wu | B25B 27/18 | 81/186 |
| 8,056,449 B2 * | 11/2011 | Hsieh | B25B 13/065 | 81/121.1 |
| D745,814 S * | 12/2015 | Hsieh | D8/29 | |
| D912,484 S * | 3/2021 | Chang | D8/29 | |
| 2007/0125204 A1 | 6/2007 | Lin | | |
| 2019/0001469 A1 * | 1/2019 | Cho | B25B 23/0035 | |
| 2025/0128384 A1 * | 4/2025 | Lee | B25B 13/065 | |

* cited by examiner

*Primary Examiner* — Hadi Shakeri
(74) *Attorney, Agent, or Firm* — LANWAY IPR SERVICES; Chun-Ming Shih

(57) ABSTRACT

An engaging structure for a hand tool includes a main body provided with a mounting element having six drive portions and six receiving portions. Each of the six drive portions includes a first face, a first groove, a second face, a second groove, a third face, a first connecting portion, a second connecting portion, a third connecting portion, and a fourth connecting portion. Each of the six receiving portions is an arcuate concave face and formed with a first arc and a first radius. The mounting element has an axis provided with a first center, a first circle, a first hexagon, and a first vertical line. The first groove constructs a second center having a second radius. The second groove constructs a third center having a third radius.

7 Claims, 12 Drawing Sheets

ENGAGING STRUCTURE FOR HAND TOOL

BACKGROUND OF THE INVENTION

Field of the Invention

The present invention relates to a hand tool and, more particularly, to an engaging structure for a hand tool.

Description of the Related Art

A conventional socket structure was disclosed in the U.S. Publication No. 2007/0125204, and comprises a socket 20 having an engaging hole 22, six grooves 23, and six stop ribs 24.

However, such a conventional socket structure has the following disadvantages.

1. When the socket 20 drives the screw head 40, the stop ribs 24 are locked on the six sides of the screw head 40, to rotate the screw head 40. The stop ribs 24 protrude in the engaging hole 22 to an extent, and a large interval is defined between the groove 23 of the engaging hole 22 and the angled corner of the screw head 40 so that the engaging hole 22 cannot easily rub the angled corner of the screw head 40. But, the socket 20 needs to have a determined thickness to keep the rotation force and torque, so that the outer diameter of the socket 20 is increased due to projection of the stop ribs 24.
2. Each of the stop ribs 24 has a sharp pointed shape so that the rotation torque is not large enough. Thus, the screw head 40 is easily worn out or chamfered by the stop ribs 24 during a period of time.
3. When the socket 20 is used to rotate the screw head 40, the stop ribs 24 engage the screw head 40 successively and easily cause a serration on the screw head 40.

BRIEF SUMMARY OF THE INVENTION

In accordance with the present invention, there is provided an engaging structure for a hand tool comprising a main body provided with a mounting element. The mounting element includes six drive portions and six receiving portions. Each of the six drive portions includes a first face, a first groove, a second face, a second groove, a third face, a first connecting portion, a second connecting portion, a third connecting portion, and a fourth connecting portion. Each of the six receiving portions is an arcuate concave face and formed with a first arc and a first radius. The mounting element has an axis provided with a first center, a first circle, a first hexagon, and a first vertical line. A first distance is defined between two parallel first faces. The first groove constructs a second center having a second radius. The second groove constructs a third center having a third radius. A second distance is defined between the second center and the third center.

According to the primary advantages of the present invention, the main body is rotated clockwise to screw the screw member by a large contact area of the second face. Alternatively, the main body is rotated counterclockwise to unscrew the screw member by a large contact area of the third face. Alternatively, the main body is rotated counterclockwise to unscrew the worn screw member by a force concentration of the third connecting portion. Thus, the mounting element has three rotational modes to drive and rotate the screw member.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
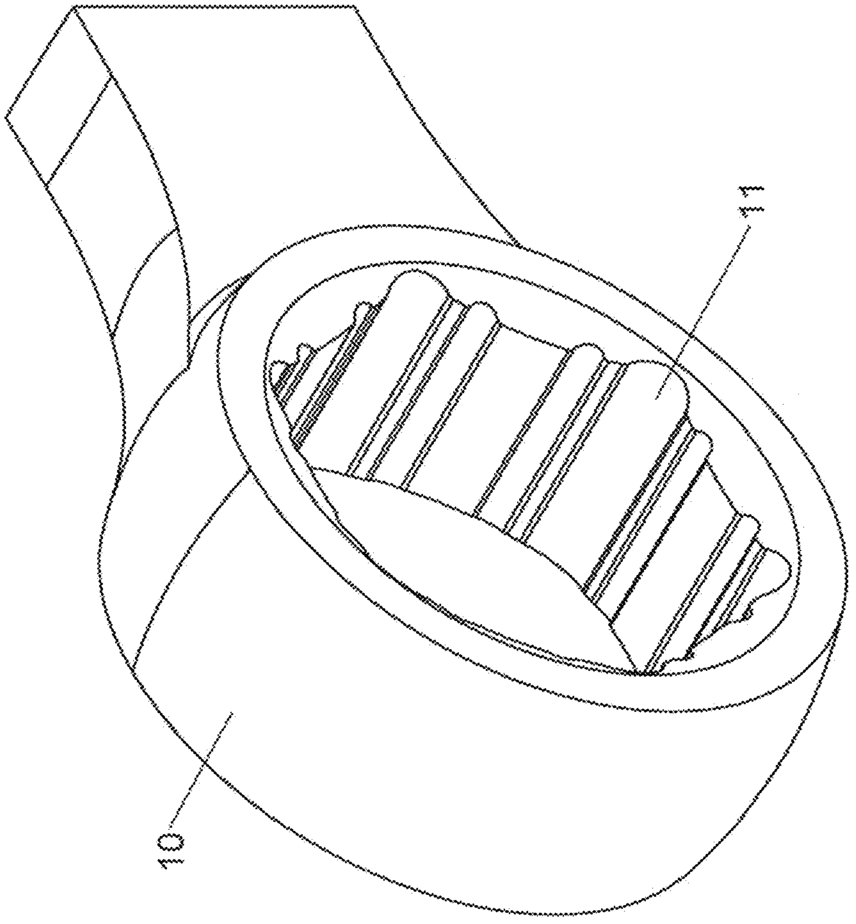
FIG. 1 is a perspective view of an engaging structure for a hand tool in accordance with the first preferred embodiment of the present invention.
Figure 2:
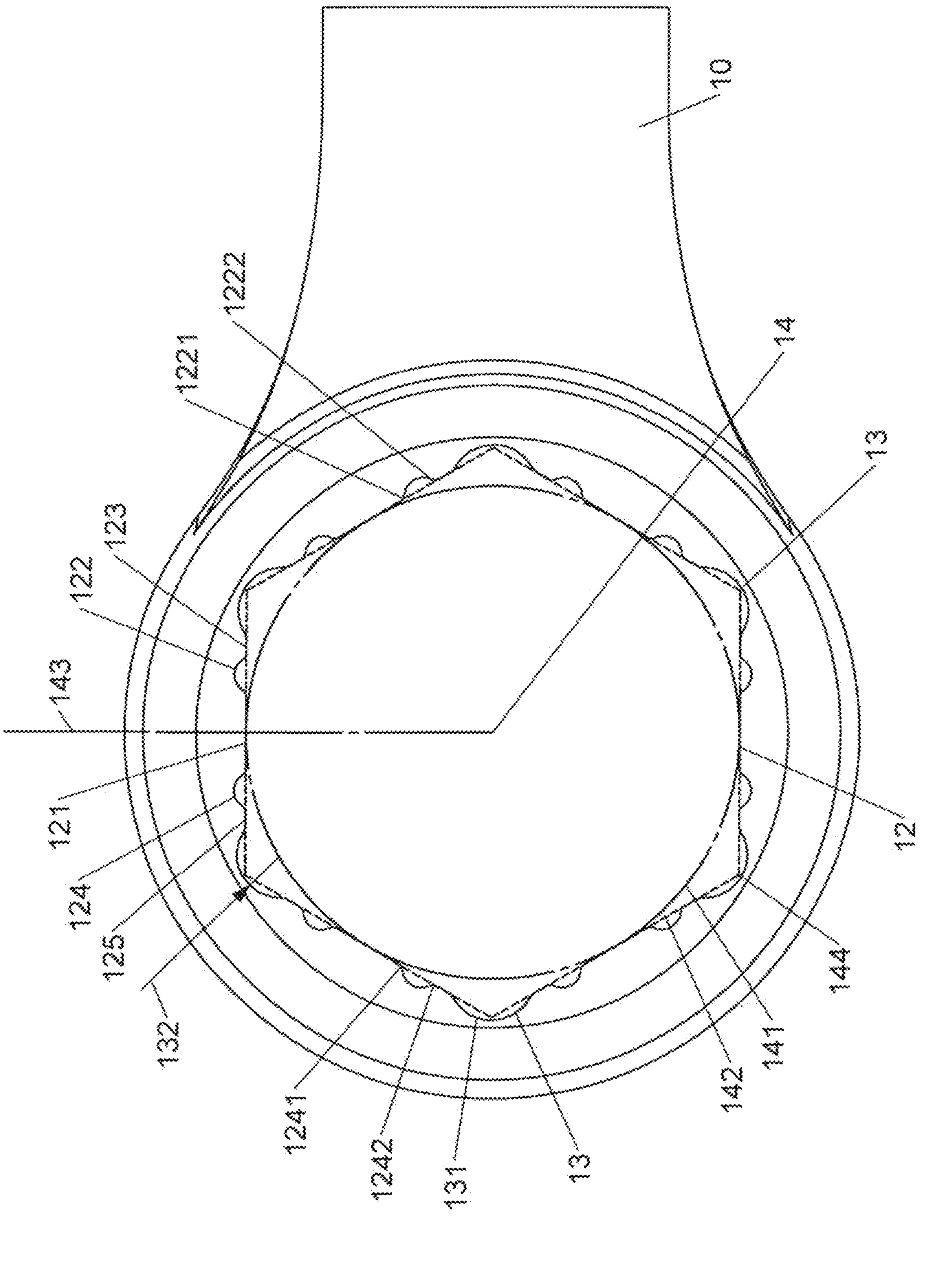
FIG. 2 is a front view of the engaging structure in accordance with the preferred embodiment of the present invention.
Figure 3:
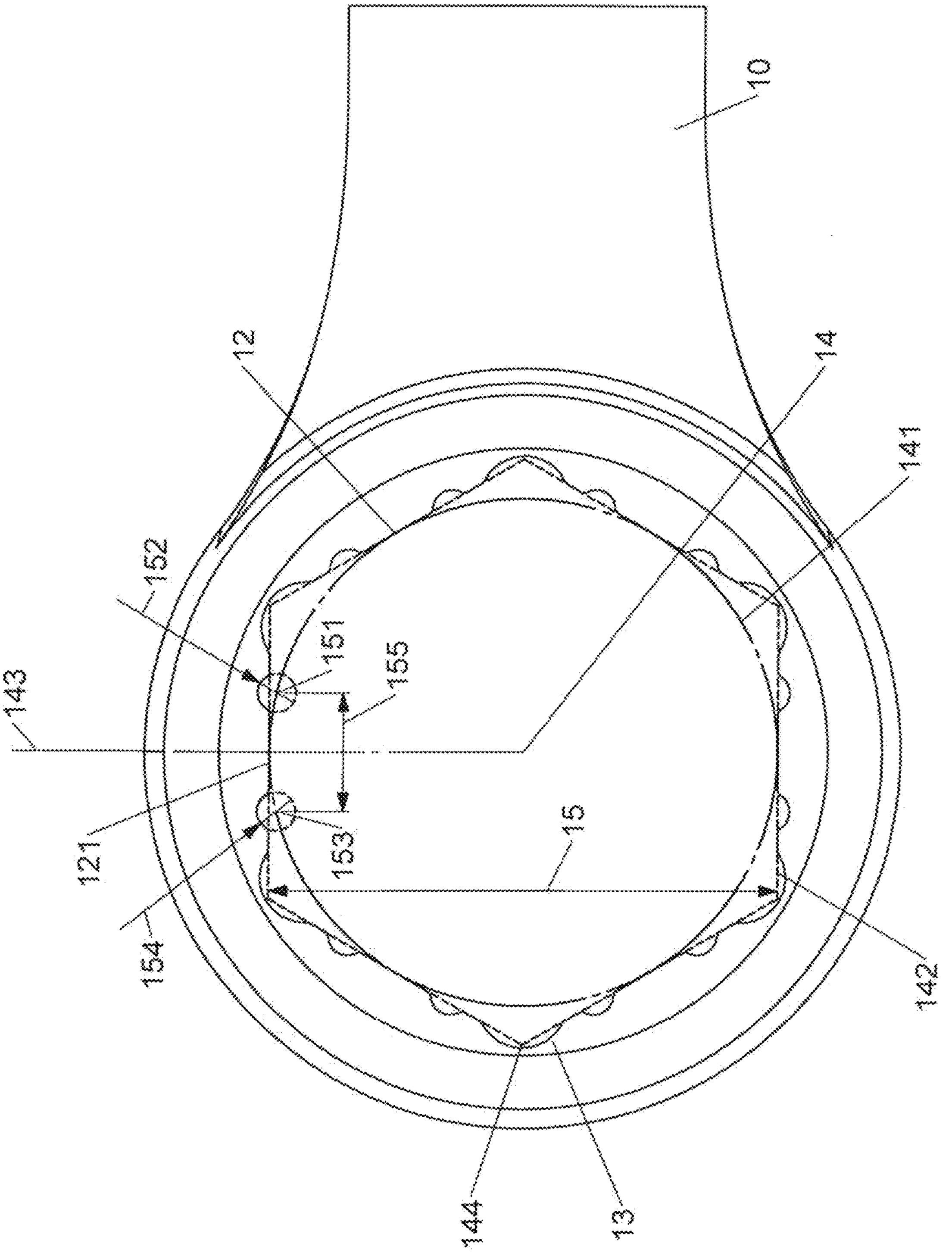
FIG. 3 is a schematic front view of the engaging structure in accordance with the preferred embodiment of the present invention.

Referring to the drawings and initially to FIGS. 1-3, an engaging structure (or an operating structure or a driving structure) for a hand tool in accordance with the preferred embodiment of the present invention comprises a main body 10. The main body 10 is provided with a mounting element 11. The mounting element 11 includes six drive portions 12 and six receiving portions 13. The six drive portions 12 and the six receiving portions 13 are arranged alternately and annularly. The main body 10 is a box end wrench or an engaging member of a hand tool.

Each of the six drive portions 12 includes a first face 121, a first groove 122, a second face 123, a second groove 124, and a third face 125. The first face 121 is located at a middle position of each of the six drive portions 12. The first face 121 has a planar shape. The first groove 122 and the second face 123 are situated at a first side of the first face 121, and the second groove 124 and the third face 125 are situated at a second side of the first face 121.

The first groove 122 is located between the first face 121 and the second face 123. The second face 123 has a planar shape. The second groove 124 is located between the first face 121 and the third face 125. The second groove 124 and the first groove 122 are arranged symmetrically relative to the first face 121. The third face 125 and the second face 123 are arranged symmetrically relative to the first face 121. The third face 125 has a planar shape. The first face 121, the second face 123, and the third face 125 are arranged linearly.

A first connecting portion 1221 is defined at an intersection of the first groove 122 and the first face 121. A second connecting portion 1222 is defined at an intersection of the first groove 122 and the second face 123. The first groove 122 has a first side smoothly connecting the first face 121 by the first connecting portion 1221, and a second side smoothly connecting the second face 123 by the second connecting portion 1222. Each of the first connecting portion 1221 and the second connecting portion 1222 is a fillet or round corner. A third connecting portion 1241 is defined at an intersection of the second groove 124 and the first face 121. A fourth connecting portion 1242 is defined at an intersection of the second groove 124 and the third face 125. The second groove 124 has a first side smoothly connecting the first face 121 by the third connecting portion 1241, and a second side smoothly connecting the third face 125 by the fourth connecting portion 1242. Each of the third connecting portion 1241 and the fourth connecting portion 1242 is a fillet or round corner. The first connecting portion 1221, the second connecting portion 1222, the third connecting portion 1241, and the fourth connecting portion 1242 have the same value.

Each of the six receiving portions 13 is an arcuate concave face. Each of the six receiving portions 13 is arranged between the second face 123 of one of the six drive portions 12 and the third face 125 of another one of the six drive portions 12. Each of the six receiving portions 13 is formed with a first arc 131. The first arc 131 is not tangent to the second face 123. The first arc 131 is not tangent to the third face 125. The first arc 131 has a first radius 132.

In a two-dimensional view, the mounting element 11 has an axis provided with a first center 14 which constructs a first circle 141. The first face 121 of each of the six drive portions 12 is tangent to the first circle 141. The first circle 141 forms a first hexagon 142 having six sides. The first face 121 of each of the six drive portions 12 coincides with each of the six sides of the first hexagon 142. The first center 14 is provided with a first vertical line 143. The first vertical line 143 passes through the first face 121. The first face 121 is perpendicular to the first vertical line 143. The first face 121 has two ends arranged symmetrically relative to the first vertical line 143, with the first vertical line 143 served as a center of the two ends of the first face 121. The first groove 122 and the second face 123 are located at a first side of the first vertical line 143, and the second groove 124 and the third face 125 are located at a second side of the first vertical line 143. The first hexagon 142 has six first angled corners 144. The first arc 131 of each of the six receiving portions 13 is situated outside of each of the six first angled corners 144.

A first distance 15 is defined between two parallel first faces 121. The first distance 15 is equal to a diameter of the first circle 141. The first groove 122 constructs a second center 151. The second center 151 has a second radius 152. The second groove 124 constructs a third center 153. The third center 153 has a third radius 154. The second center 151 and the third center 153 are arranged in the first hexagon 142. The first circle 141 passes through the second center 151 and the third center 153. A second distance 155 is defined between the second center 151 and the third center 153.

The third radius 154 is equal to the second radius 152. The second radius 152 is less than the first radius 132 or less than half of the first radius 132. The second radius 152 is ranged between 0.075 and 0.08 of the first distance 15. The second distance 155 is ranged between 0.2 and 0.27 of the first distance 15 or the second distance 155 is one fourth of the first distance 15.

Figure 4:
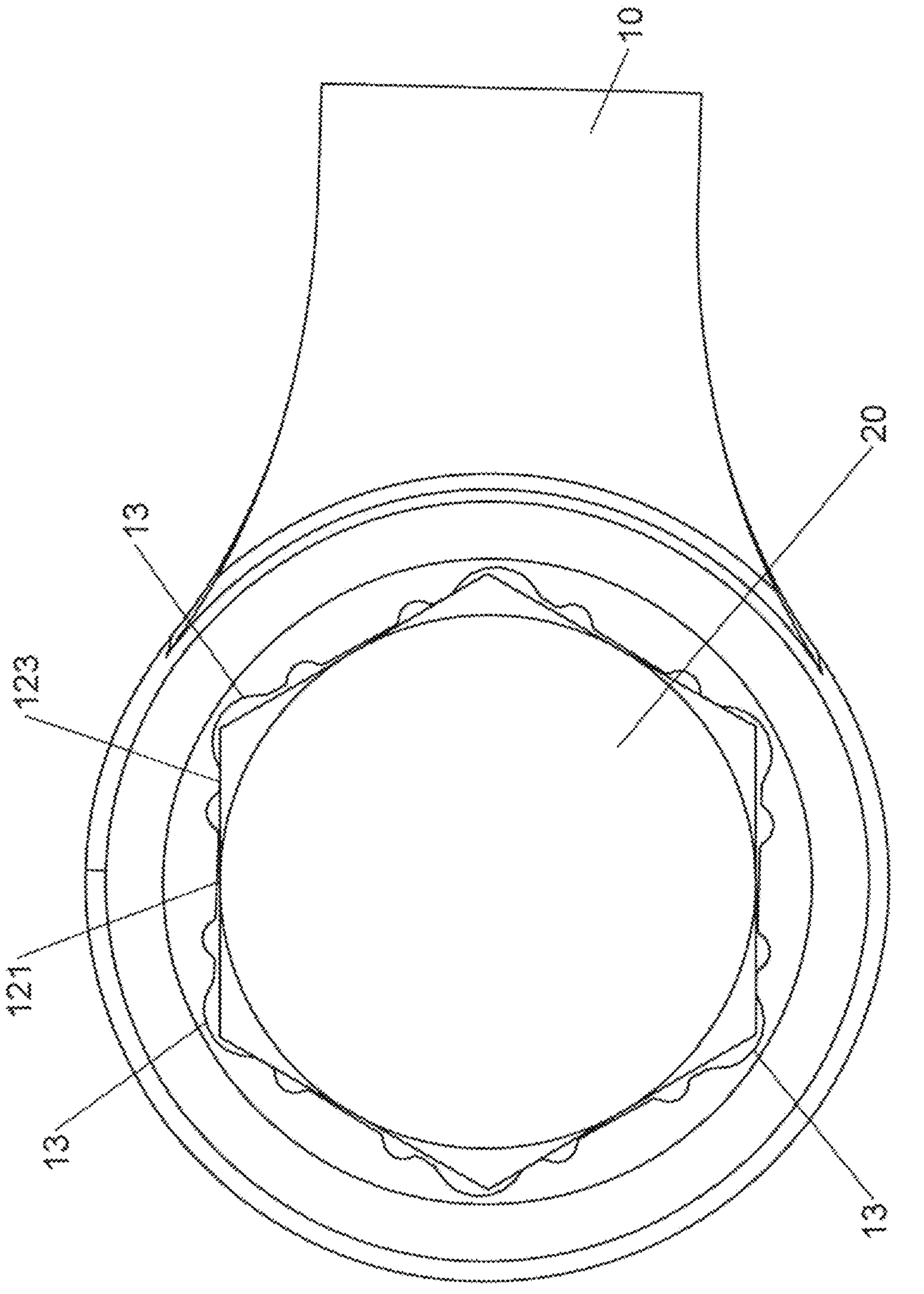
FIG. 4 is a front view of a first operation state of the engaging structure in accordance with the preferred embodiment of the present invention.

Referring to FIG. 4 with reference to FIGS. 1-3, the main body 10 is used to operate and rotate a screw member 20 having six sides and six angled corners. When the main body 10 is rotated clockwise to drive the screw member 20, the second face 123 of each of the six drive portions 12 presses each of the six sides of the screw member 20, and a space (or an interval) is defined between the third face 125 of each of the six drive portions 12 and each of the six sides of the screw member 20. At the same time, each of the six angled corners of the screw member 20 is received in each of the six receiving portions 13, so that when the mounting element 11 of the main body 10 is rotated clockwise to drive the screw member 20, each of the six receiving portions 13 is spaced from each of the six angled corners of the screw member 20, to prevent each of the six angled corners of the screw member 20 from being worn by the mounting element 11.

Figure 5:
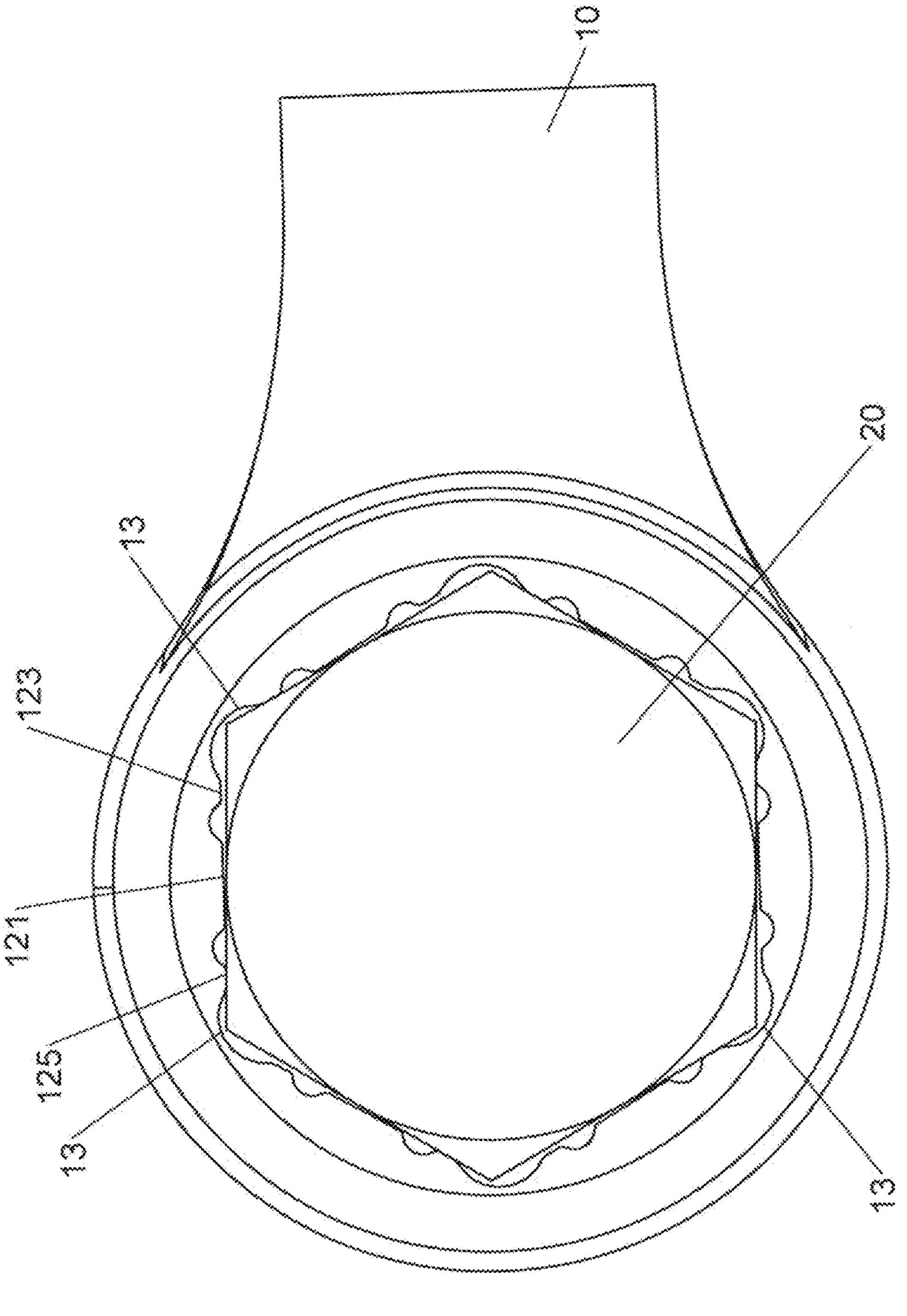
FIG. 5 is a front view of a second operation state of the engaging structure in accordance with the preferred embodiment of the present invention.

Referring to FIG. 5 with reference to FIGS. 1-3, when the main body 10 is rotated counterclockwise to drive the screw member 20, the third face 125 of each of the six drive portions 12 presses each of the six sides of the screw member 20, and a space (or an interval) is defined between the second face 123 of each of the six drive portions 12 and each of the six sides of the screw member 20. At the same time, each of the six angled corners of the screw member 20 is received in each of the six receiving portions 13, so that when the mounting element 11 of the main body 10 is rotated counterclockwise to drive the screw member 20, each of the six receiving portions 13 is spaced from each of the six angled corners of the screw member 20, to prevent each of the six angled corners of the screw member 20 from being worn by the mounting element 11.

Figure 6:
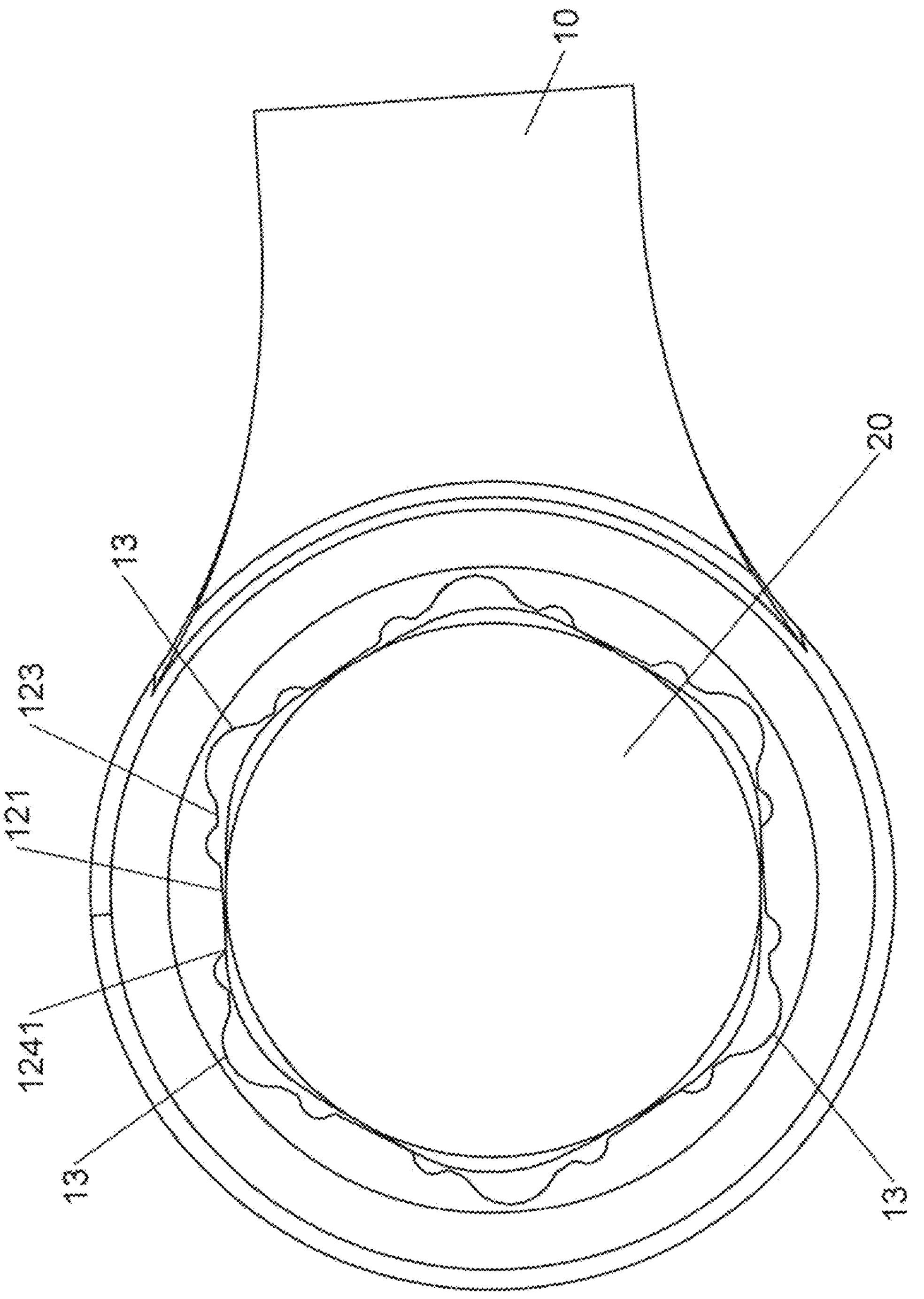
FIG. 6 is a front view of a third operation state of the engaging structure in accordance with the preferred embodiment of the present invention.

Referring to FIG. 6 with reference to FIGS. 1-3, the screw member 20 is worn out and rounded. When the main body 10 is rotated counterclockwise to drive the screw member 20, the third connecting portion 1241 of each of the six drive portions 12 presses each of the six sides of the screw member 20. In such a manner, the third connecting portion 1241 of each of the six drive portions 12 has a face contact with each of the six sides of the screw member 20 so that the third connecting portion 1241 of each of the six drive portions 12 concentrates the force point to drive and rotate the screw member 20 exactly and easily. Thus, the mounting element 11 is used to drive and rotate the screw member 20 that has been worn out. At this time, the third connecting portion 1241 of each of the six drive portions 12 is closer to the first vertical line 143. In general, the worn portion of the screw member 20 is far from the first vertical line 143 so that the third connecting portion 1241 of each of the six drive portions 12 is easy to drive and rotate the screw member 20.

Figure 7:
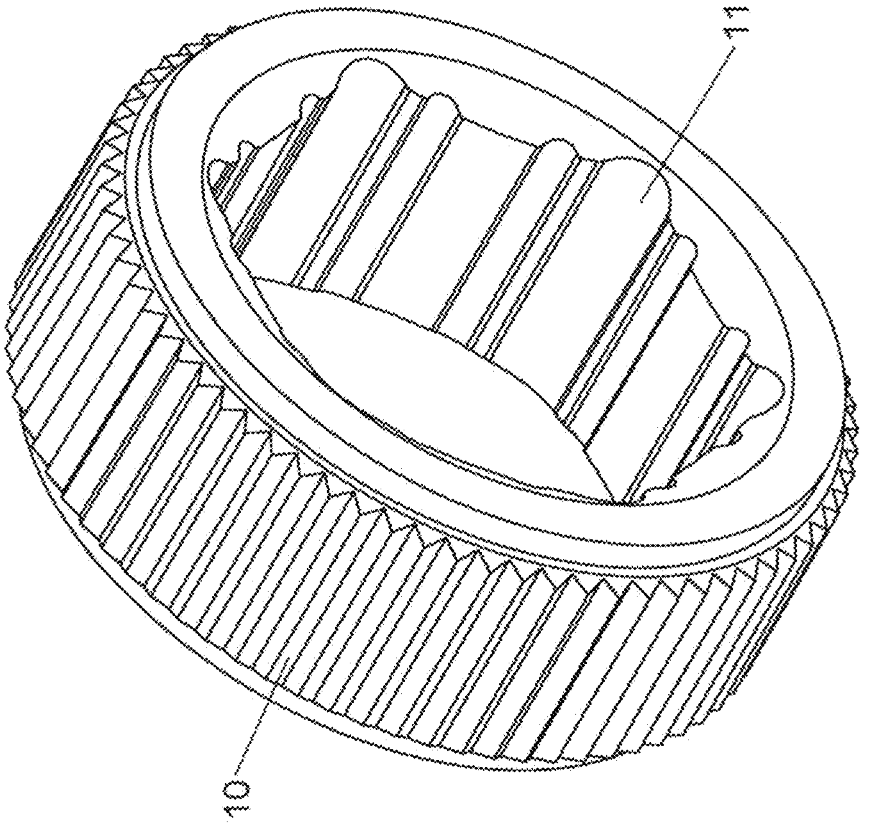
FIG. 7 is a perspective view of an engaging structure for a hand tool in accordance with the second preferred embodiment of the present invention.

Referring to FIG. 7, the main body 10 is a ratchet wheel structure pivotally mounted on a ratchet wrench.

Figure 8:
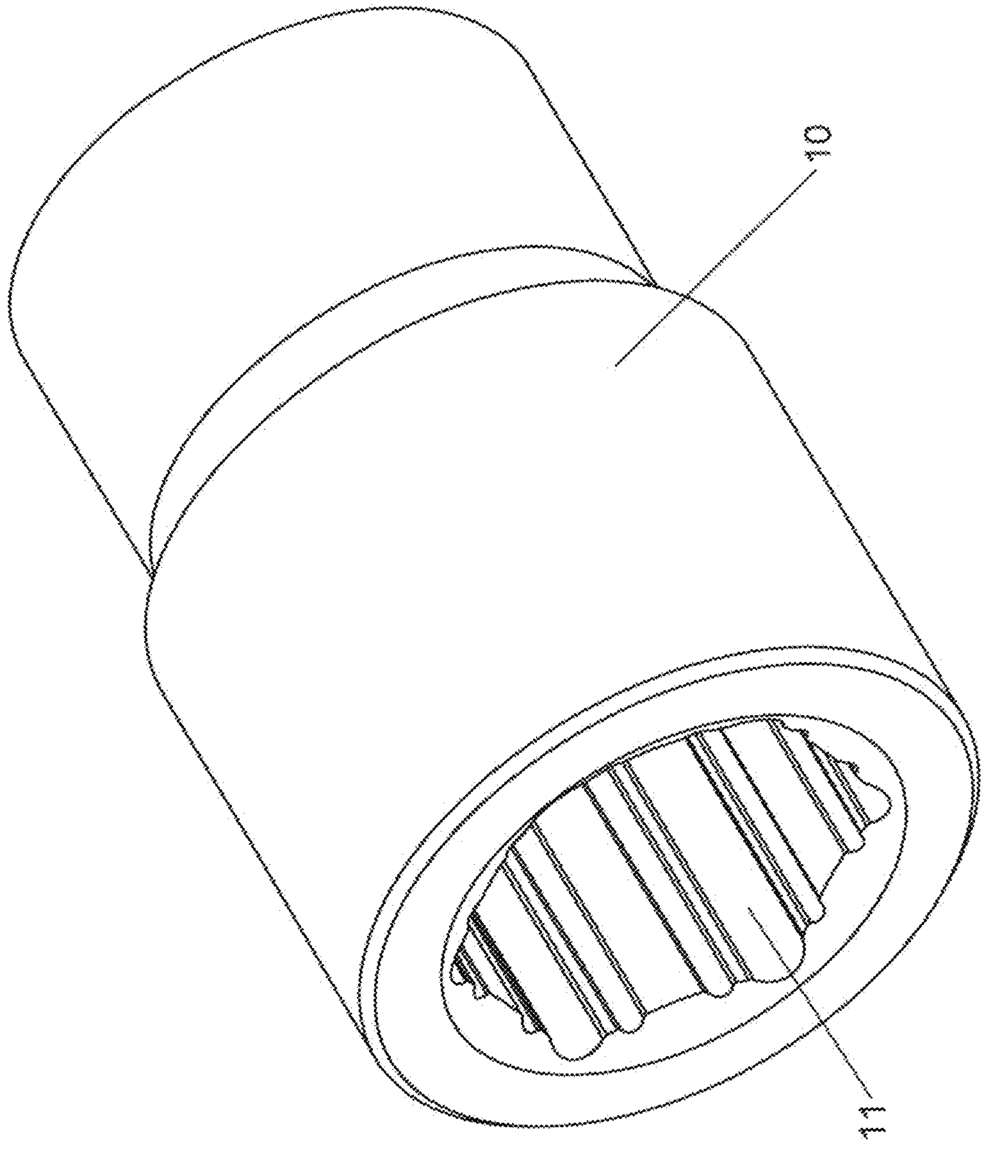
FIG. 8 is a perspective view of an engaging structure for a hand tool in accordance with the third preferred embodiment of the present invention.

Referring to FIG. 8, the main body 10 is a socket structure.

Figure 9:
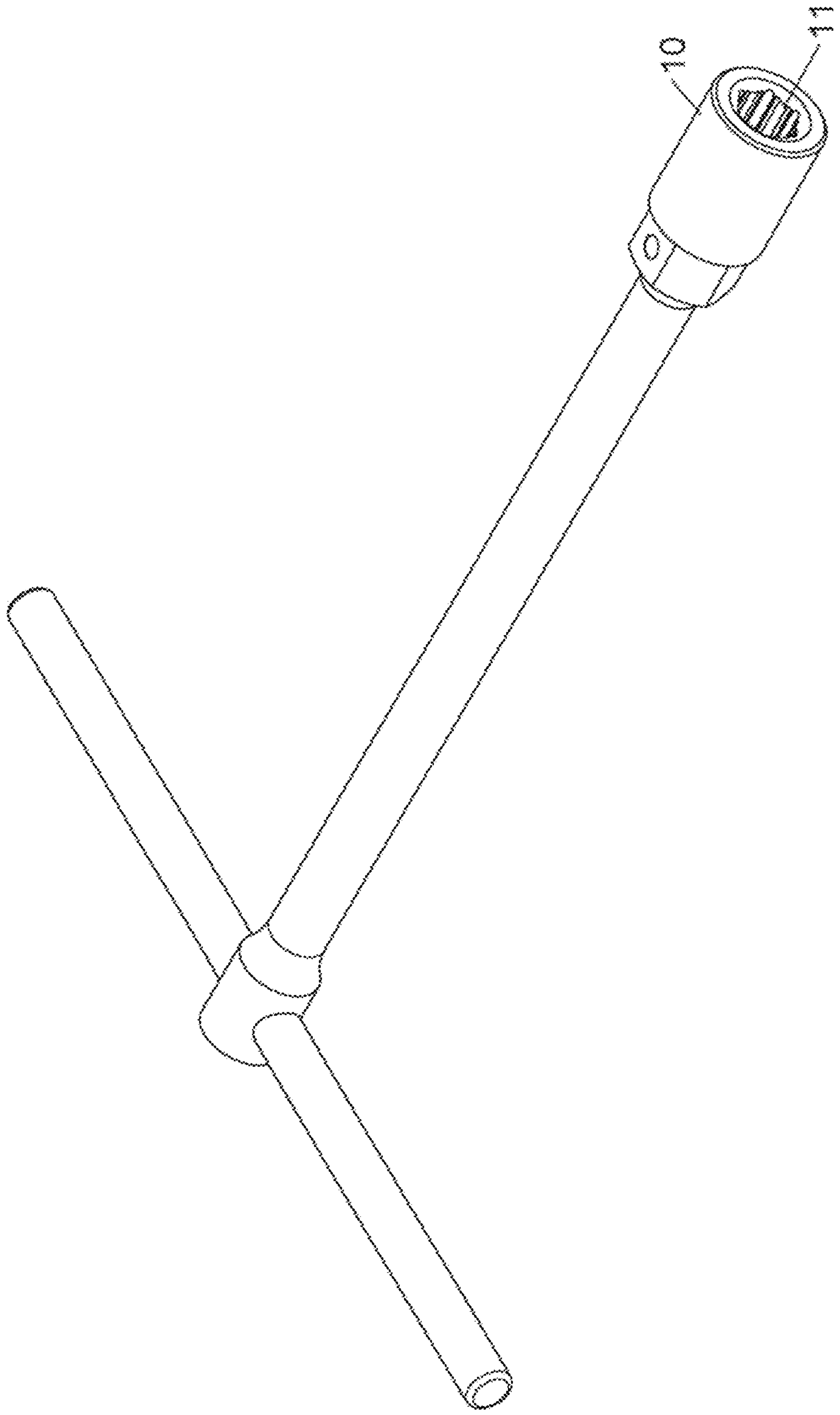
FIG. 9 is a perspective view of an engaging structure for a hand tool in accordance with the fourth preferred embodiment of the present invention.

Referring to FIG. 9, the main body 10 is a sliding rod structure.

Figure 10:
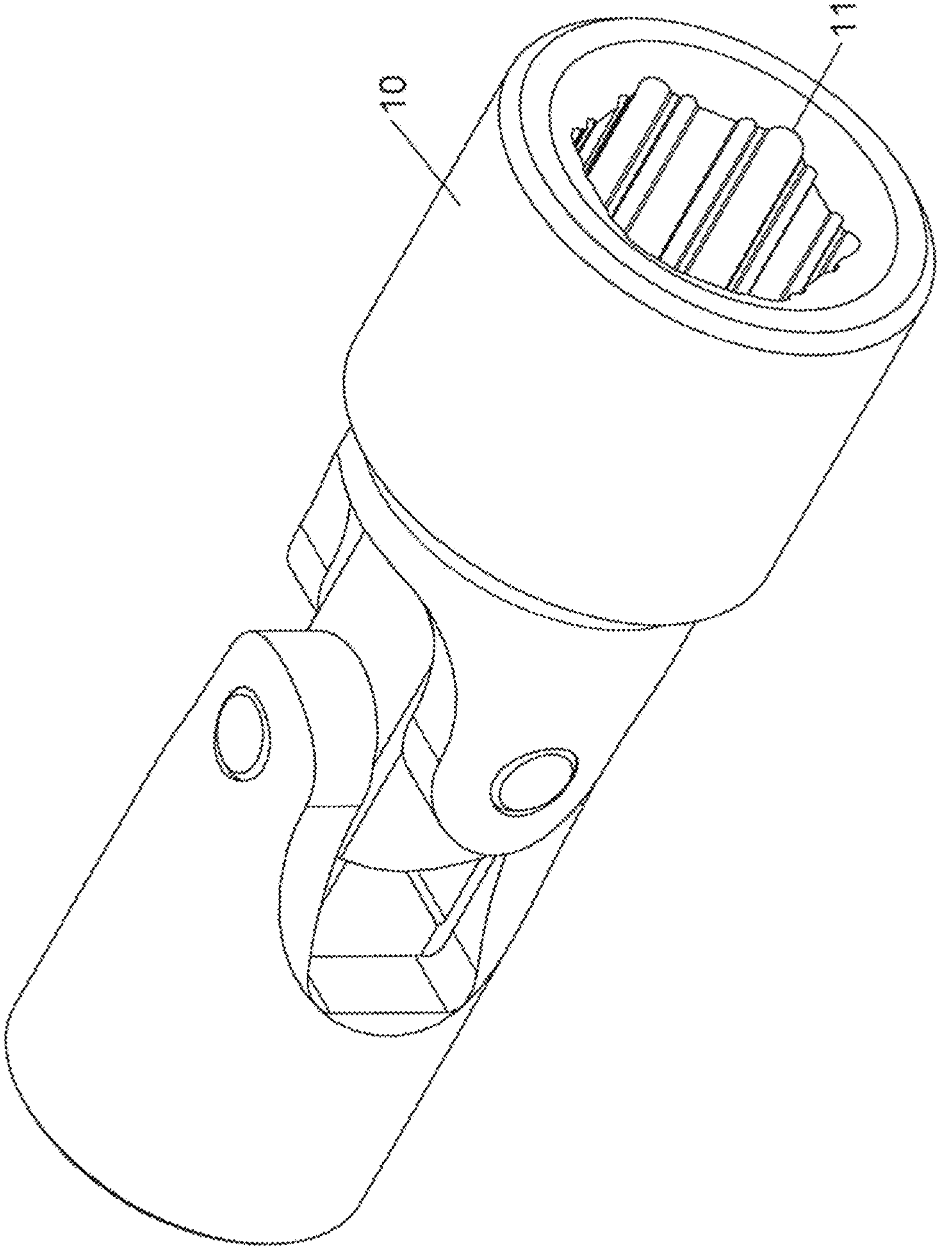
FIG. 10 is a perspective view of an engaging structure for a hand tool in accordance with the fifth preferred embodiment of the present invention.

Referring to FIG. 10, the main body 10 is a float connector or a universal connector or a T-shaped universal connector.

Figure 11:
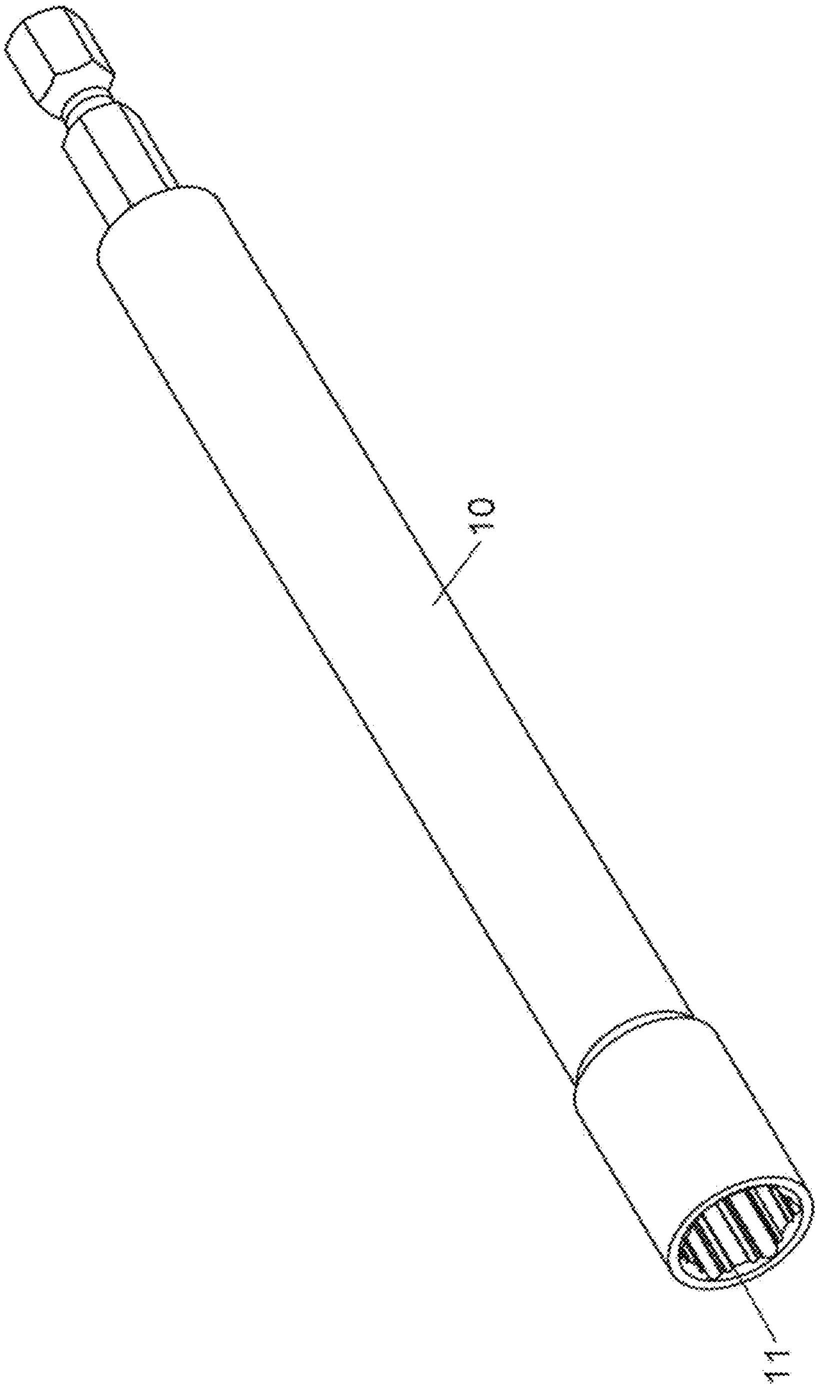
FIG. 11 is a perspective view of an engaging structure for a hand tool in accordance with the sixth preferred embodiment of the present invention.

Referring to FIG. 11, the main body 10 is a connecting rod structure.

Figure 12:
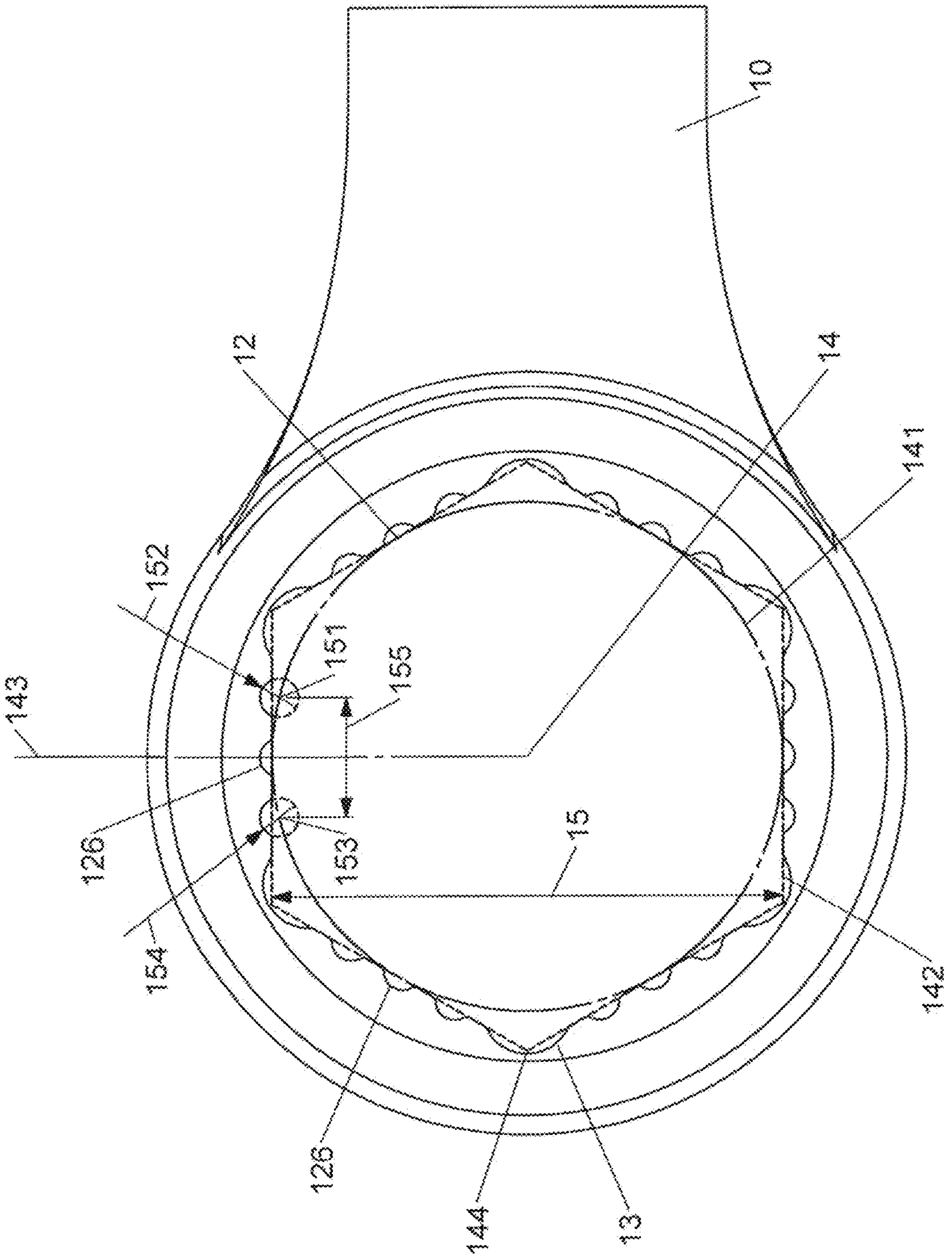
FIG. 12 is a schematic front view of an engaging structure for a hand tool in accordance with the seventh preferred embodiment of the present invention.

Referring to FIG. 12, each of the six drive portions 12 further includes a third groove 126. The third groove 126 is located at a middle position of the first face 121. The third groove 126 has a radius equal to that of the first groove 122 and equal to that of the second groove 124. The third groove 126 is arranged between the first groove 122 and the second groove 124. The third groove 126 has an arcuate face with a center which the first vertical line 143 passes through.

In another preferred embodiment of the present invention, a fillet (or round corner) is formed between each of the six receiving portions 13 and the second face 123 of each of the six drive portions 12, so that each of the six receiving portions 13 and the second face 123 of each of the six drive portions 12 are connected smoothly. A fillet (or round corner) is formed between each of the six receiving portions 13 and the third face 125 of each of the six drive portions 12, so that each of the six receiving portions 13 and the third face 125 of each of the six drive portions 12 are connected smoothly. In addition, each of the first connecting portion 1221, the second connecting portion 1222, the third connecting portion 1241, and the fourth connecting portion 1242 is an inclined guide angle or an intersection.

Accordingly, the engaging structure for a hand tool of the present invention has the following advantages.

1. With reference to FIG. 4, when the main body 10 is rotated clockwise to drive the screw member 20, the second face 123 of each of the six drive portions 12 provides a primary force, and the first face 121 of each of the six drive portions 12 provides a secondary force. Thus, the second face 123 has the maximum contact area with the screw member 20, to prevent the six sides of the screw member 20 from being worn out.
2. With reference to FIG. 5, when the main body 10 is rotated counterclockwise to drive the screw member 20, the third face 125 of each of the six drive portions 12 provides a primary force, and the first face 121 of each of the six drive portions 12 provides a secondary force. Thus, the third face 125 has a larger contact area with the screw member 20, to prevent the six sides of the screw member 20 from being worn out.
3. With reference to FIG. 6, when the screw member 20 is worn out and rounded, the third connecting portion 1241 of each of the six drive portions 12 presses each of the six worn sides of the screw member 20 with a little contact area. Thus, the third connecting portion 1241 of each of the six drive portions 12 concentrates the force point to drive and rotate the screw member 20 exactly and easily. At this time, the third connecting portion 1241 of each of the six drive portions 12 is closer to the first vertical line 143, and the worn portion of the screw member 20 is far from the first vertical line 143 so that the third connecting portion 1241 of each of the six drive portions 12 is able to drive and rotate the screw member 20.
4. The main body 10 is rotated clockwise to screw the screw member 20 by a large contact area of the second face 123. Alternatively, the main body 10 is rotated counterclockwise to unscrew the screw member 20 by a large contact area of the third face 125. Alternatively, the main body 10 is rotated counterclockwise to unscrew the worn screw member 20 by a force concentration of the third connecting portion 1241. Thus, the mounting element 11 has three rotational modes to drive and rotate the screw member 20.
5. Each of the six receiving portions 13 is an arcuate concave face. Each of the six receiving portions 13 is arranged between the second face 123 of one of the six drive portions 12 and the third face 125 of another one of the six drive portions 12. Each of the six receiving portions 13 is formed with a first arc 131. The first arc 131 is not tangent to the second face 123 and the third face 125. Thus, when the main body 10 is rotated to drive the screw member 20, each of the six angled corners of the screw member 20 is received in each of the six receiving portions 13, thereby preventing each of the six angled corners of the screw member 20 from being worn out.
6. Each of the first face 121, the second face 123, and the third face 125 has a planar shape, so that the first face 121, the second face 123, and the third face 125 will not cause a bite mark (or serration) on the screw member 20 during rotation.
7. The third radius 154 is equal to the second radius 152. The second radius 152 is ranged between 0.075 and 0.08 of the first distance 15. The second distance 155 is ranged between 0.2 and 0.27 of the first distance 15 or the second distance 155 is one fourth of the first distance 15. In such a manner, the first distance 15, the second radius 152, the third radius 154, and the second distance 155 have numerical relationship and form mathematic expressions of the mounting element 11. Thus, after the value of the first distance 15 is designed and finished, the values of the second radius 152, the third radius 154, and the second distance 155 are also determined, without having to design and calculate the variables of each of the specifications of the mounting element 11, thereby greatly decreasing the cost of fabrication.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. An engaging structure for a hand tool, comprising:
a main body;
wherein:
the main body is provided with a mounting element;
the mounting element includes six drive portions and six receiving portions;
the six drive portions and the six receiving portions are arranged alternately and annularly;
each of the six drive portions includes a first face, a first groove, a second face, a second groove, and a third face;
the first face is located at a middle position of each of the six drive portions;
the first face has a planar shape;
the first groove and the second face are situated at a first side of the first face;
the second groove and the third face are situated at a second side of the first face;
the first groove is located between the first face and the second face;
the second face has a planar shape;
the second groove is located between the first face and the third face;
the second groove and the first groove are arranged symmetrically relative to the first face;

the third face and the second face are arranged symmetrically relative to the first face;
the third face has a planar shape;
the first face, the second face, and the third face are arranged linearly;
a first connecting portion is defined at an intersection of the first groove and the first face;
a second connecting portion is defined at an intersection of the first groove and the second face;
the first groove has a first side smoothly connecting the first face by the first connecting portion, and a second side smoothly connecting the second face by the second connecting portion;
each of the first connecting portion and the second connecting portion is a fillet or round corner;
a third connecting portion is defined at an intersection of the second groove and the first face;
a fourth connecting portion is defined at an intersection of the second groove and the third face;
the second groove has a first side smoothly connecting the first face by the third connecting portion, and a second side smoothly connecting the third face by the fourth connecting portion;
each of the third connecting portion and the fourth connecting portion is a fillet or round corner;
the first connecting portion, the second connecting portion, the third connecting portion, and the fourth connecting portion have the same value;
each of the six receiving portions is an arcuate concave face;
each of the six receiving portions is arranged between the second face of one of the six drive portions and the third face of another one of the six drive portions;
each of the six receiving portions is formed with a first arc;
the first arc is not tangent to the second face;
the first arc is not tangent to the third face;
the first arc has a first radius;
in a two-dimensional view, the mounting element has an axis provided with a first center which constructs a first circle;
the first face of each of the six drive portions is tangent to the first circle;
the first circle forms a first hexagon having six sides;
the first face of each of the six drive portions coincides with each of the six sides of the first hexagon;
the first center is provided with a first vertical line;
the first vertical line passes through the first face;
the first face is perpendicular to the first vertical line;
the first face has two ends arranged symmetrically relative to the first vertical line, with the first vertical line served as a center of the two ends of the first face;
the first groove and the second face are located at a first side of the first vertical line;
the second groove and the third face are located at a second side of the first vertical line;
the first hexagon has six first angled corners;
the first arc of each of the six receiving portions is situated outside of each of the six first angled corners;
a first distance is defined between two parallel first faces;
the first distance is equal to a diameter of the first circle;
the first groove constructs a second center;
the second center has a second radius;
the second groove constructs a third center;
the third center has a third radius;
the second center and the third center are arranged in the first hexagon;
the first circle passes through the second center and the third center;
a second distance is defined between the second center and the third center;
the second radius is ranged between 0.075 and 0.08 of the first distance; and
the second distance is ranged between 0.2 and 0.27 of the first distance or the second distance is one fourth of the first distance.

2. The engaging structure for a hand tool as claimed in claim 1, wherein the main body is a box end wrench or an engaging member of a hand tool.

3. The engaging structure for a hand tool as claimed in claim 1, wherein the third radius is equal to the second radius, and the second radius is less than the first radius or less than half of the first radius.

4. The engaging structure for a hand tool as claimed in claim 1, wherein the main body is a ratchet wheel structure pivotally mounted on a ratchet wrench or the main body is a socket structure.

5. The engaging structure for a hand tool as claimed in claim 1, wherein the main body is a sliding rod structure, a float connector, a universal connector, a T-shaped universal connector or a connecting rod structure.

6. An engaging structure for a hand tool, comprising:
a main body:
wherein:
the main body is provided with a mounting element;
the mounting element includes six drive portions and six receiving portions;
the six drive portions and the six receiving portions are arranged alternately and annularly;
each of the six drive portions includes a first face, a first groove, a second face, a second groove, and a third face;
the first face is located at a middle position of each of the six drive portions;
the first face has a planar shape;
the first groove and the second face are situated at a first side of the first face;
the second groove and the third face are situated at a second side of the first face;
the first groove is located between the first face and the second face;
the second face has a planar shape;
the second groove is located between the first face and the third face;
the second groove and the first groove are arranged symmetrically relative to the first face;
the third face and the second face are arranged symmetrically relative to the first face;
the third face has a planar shape;
the first face, the second face, and the third face are arranged linearly;
a first connecting portion is defined at an intersection of the first groove and the first face;
a second connecting portion is defined at an intersection of the first groove and the second face;
the first groove has a first side smoothly connecting the first face by the first connecting portion, and a second side smoothly connecting the second face by the second connecting portion;
each of the first connecting portion and the second connecting portion is a fillet or round corner;
a third connecting portion is defined at an intersection of the second groove and the first face;

a fourth connecting portion is defined at an intersection of the second groove and the third face;

the second groove has a first side smoothly connecting the first face by the third connecting portion, and a second side smoothly connecting the third face by the fourth connecting portion;

each of the third connecting portion and the fourth connecting portion is a fillet or round corner;

the first connecting portion, the second connecting portion, the third connecting portion, and the fourth connecting portion have the same value;

each of the six receiving portions is an arcuate concave face;

each of the six receiving portions is arranged between the second face of one of the six drive portions and the third face of another one of the six drive portions;

each of the six receiving portions is formed with a first arc;

the first arc is not tangent to the second face;

the first arc is not tangent to the third face;

the first arc has a first radius;

in a two-dimensional view, the mounting element has an axis provided with a first center which constructs a first circle;

the first face of each of the six drive portions is tangent to the first circle;

the first circle forms a first hexagon having six sides;

the first face of each of the six drive portions coincides with each of the six sides of the first hexagon;

the first center is provided with a first vertical line;

the first vertical line passes through the first face;

the first face is perpendicular to the first vertical line;

the first face has two ends arranged symmetrically relative to the first vertical line, with the first vertical line served as a center of the two ends of the first face;

the first groove and the second face are located at a first side of the first vertical line;

the second groove and the third face are located at a second side of the first vertical line;

the first hexagon has six first angled corners;

the first arc of each of the six receiving portions is situated outside of each of the six first angled corners;

a first distance is defined between two parallel first faces;

the first distance is equal to a diameter of the first circle;

the first groove constructs a second center;

the second center has a second radius;

the second groove constructs a third center;

the third center has a third radius;

the second center and the third center are arranged in the first hexagon;

the first circle passes through the second center and the third center;

a second distance is defined between the second center and the third center;

each of the six drive portions further includes a third groove;

the third groove is located at a middle position of the first face;

the third groove has a radius equal to that of the first groove and equal to that of the second groove;

the third groove is arranged between the first groove and the second groove; and the third groove has an arcuate face with a center which the first vertical line passes through.

7. The engaging structure for a hand tool as claimed in claim 1, wherein:

a fillet is formed between each of the six receiving portions and the second face of each of the six drive portions, so that each of the six receiving portions and the second face of each of the six drive portions are connected smoothly;

a fillet is formed between each of the six receiving portions and the third face of each of the six drive portions, so that each of the six receiving portions and the third face of each of the six drive portions are connected smoothly; and each of the first connecting portion, the second connecting portion, the third connecting portion, and the fourth connecting portion is an inclined guide angle or an intersection.

* * * * *